United States Patent [19]

Sasakura et al.

[11] 4,084,548
[45] Apr. 18, 1978

[54] ROTARY PISTON ENGINE

[75] Inventors: Hachiro Sasakura, Inuyama; Hitoshi Kanmura, Okazaki, both of Japan

[73] Assignee: Nippon Soken, Inc., Nishio, Japan

[21] Appl. No.: 696,367

[22] Filed: Jun. 15, 1976

[30] Foreign Application Priority Data

Jun. 25, 1975   Japan ............................. 50-90377[U]
Mar. 12, 1976  Japan ............................. 51-30557[U]

[51] Int. Cl.² ........................................... F02B 53/12
[52] U.S. Cl. ................................................. 123/205
[58] Field of Search ................. 123/8.09, 8.13, 169 C, 123/169 CL, 169 V

[56] References Cited

U.S. PATENT DOCUMENTS 3,886,907  6/1975  Loyd ..................................... 123/8.13
3,926,169  12/1975 Leshner et al. ................... 123/8.09 X

FOREIGN PATENT DOCUMENTS 1,812,933   6/1970   Germany ............................ 123/8.09
2,328,174   12/1974  Germany ............................ 123/8.09
102,222    11/1916  United Kingdom ............. 123/169 V Primary Examiner—Carlton R. Croyle
Assistant Examiner—Michael Koczo, Jr.
Attorney, Agent, or Firm—Cushman, Darby & Cushman

[57] ABSTRACT

A rotary piston engine has a rotor housing and a rotor disposed therein for planetary rotary motion. The housing and the rotor cooperate to define a plurality of variable volume working chambers each of which is moved along the inner peripheral surfaces of the housing and acts as intake, compression, combustion-expansion and exhaust chambers as the rotary planetary motion proceeds. A plug hole in which electrodes of an ignition plug are disposed is formed in the housing and so positioned as to be communicated with the intake chamber at its final stage of intake stroke. A passage is formed in the housing and connected at one end to the plug hole. The other end of the passage is connected to a supply source of a combustible gas, such as LPG or air-gasoline mixture, or to the atmosphere. A check valve is disposed in the passage and operative when the plug hole is open to the intake chamber to allow the gaseous fuel or air to flow from the passage into the plug hole and into the intake chamber, whereby the plug electrodes and the plug hole are scavenged for improved and stable ignitions of charges of air-fuel mixture.

9 Claims, 4 Drawing Figures

ROTARY PISTON ENGINE

BACKGROUND OF THE INVENTION

1. Field of the Invention

The present invention relates generally to a rotary piston engine and, more particularly, to a rotary piston engine provided with means for positively removing residual or burnt inert gases from a plug hole in which electrodes of an ignition plug are disposed thereby to effectively scavenge the plug hole and the plug electrodes.

2. Description of Prior Art

A rotary piston engine is known to have a rotor housing comprising a peripheral housing part and a pair of axially spaced side housing parts secured to opposite ends of the peripheral housing part. The housing parts define a cavity therein. The inner peripheral surface of the peripheral housing part is formed of epitrochoidal curves. A generally triangular rotary piston or rotor is received in the cavity for planetary rotary motion therein. The rotor is cooperative with the inner surfaces of the rotor housing to define therebetween a plurality of working chambers each of which is moved with one of the sides of the rotor and along the inner peripheral surface of the rotor housing and sequentially transformed into intake, compression, combustion expansion and exhaust chambers as the planetary rotary motion proceeeds. An ignition plug or plugs is mounted usually on the peripheral housing part and has a set of electrodes disposed in a plug hole formed in the peripheral housing part and opened in the inner peripheral surface of the peripheral housing part. The plug hole has been designed to have a diameter which is small enough to minimize the flow or leakage of a working fluid caused by the pressure difference between each adjacent pair of working chambers. The leakage unavoidably takes place from one chamber to another across the rotor apex therebetween and through the plug hole when the rotor apex is positioned just in front of the plug hole. Due to the small diameter of the opening of the plug hole, the prior art rotary piston engine has suffered from incomplete scavenging of the plug hole and the plug electrodes therein. Considered from a static point of view, residual or burnt inert gases produced in the plug hole are exhausted and discharged from the plug hole on expansion and exhaust strokes to an extent where the pressure within the plug hole is reduced to substantially the atmospheric pressure. In the succeeding intake stroke, a charge of air-fuel mixture is compressed in the intake chamber correspoindingly to the compression ratio of the engine. The part of the residual gases retained in the plug hole is thus also subjected to compression thereby to form a mass of compressed residual gases. In the event where the mass of compressed residual gases is placed around or adjacent to the plug electrodes, there has been caused a misfire. In addition, even if a volume of ignitable air-fuel mixture is ignited in the plug hole, the presence of the mass of compressed residual gases in the plug hole adversely affects the temperature rise of the combustion of the air-fuel mixture in the plug hole because of the heat capacity of the mass of compressed residual gases therein. Moreover, since the burning velocity in the entire intake chamber is small especially when the engine is operated in a light or partial load condition, the engine is arranged such that the spark discharge is produced before the rotor reaches the top dead center. This ignition timing setting increases the ratio of the mass of residual gases in the plug hole relative to the volume of ignitable air-fuel mixture therein and, thus, increases the frequency in the production of misfires with resultant decrease in the operability of the vehicle on which the engine is mounted and also with resultant increase in the emission of harmful components of engine exhaust gases.

SUMMARY OF THE INVENTION

The present invention has its object to positively remove residual gases from the plug hole to effectively scavenge the plug hole and the plug electrodes therein by introducing a fresh fluid through the plug hole into the intake chamber in the engine, for thereby assuring stable ignitions by the ignition plug and improving the emission control.

The rotary piston engine according to the present invention has an improvement which comprises a passage means for introducing a fresh fluid through the plug hole in the intake chamber and check valve means disposed in the passage means and arranged to allow the fresh fluid to flow through the passage means only in the direction toward the intake chamber. The plug hole may preferably be positioned in the housing such that the plug hole is communicated with the intake chamber when the intake chamber is in its final stage of intake stroke. The fresh fluid may be either a combustible gas, such as a gas obtained from a container of a liquefied gas (such as LPG) or a mixture of air and an atomized fuel (such as gasoline) produced by a carburetor, or air. The passage means may preferably have a part which is formed in the rotor housing and connected to the plug hole at a point adjacent to the plug electrodes. The other end of the passage means may be either connected to the supply source of the combustible gas or opened to the atmosphere. The check valve means may preferably be mounted on the rotor housing and has a valve member disposed in the part of the passage means formed in the housing.

The above and other objects, features and advantages of the present invention will be made more apparent by the following description with reference to the accompanying drawings.

DESCRIPTION OF PREFERRED EMBODIMENTS

Figure 1:
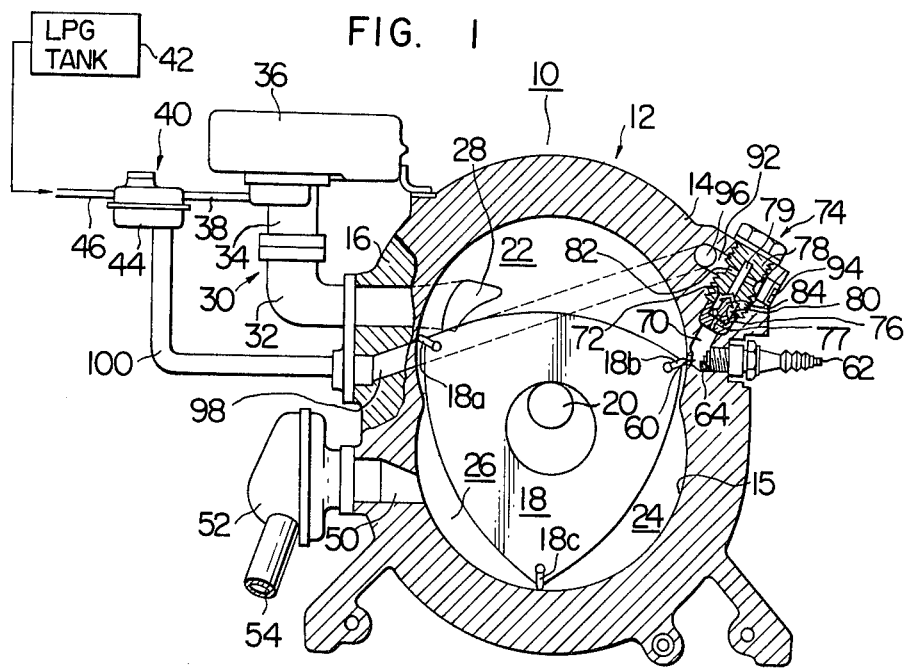
FIG. 1 is a partially diagrammatic, sectional side elevation of an embodiment of the rotary piston engine according to the present invention.
Figure 1A:
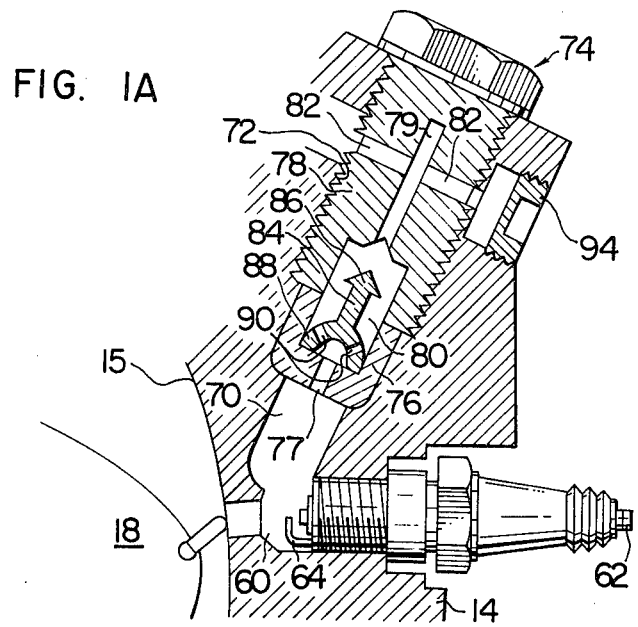
FIG. 1A is an enlarged fragmentary sectional view of a part of the engine shown in FIG. 1.

Referring first to FIGS. 1 and 1A, an embodiment of the rotary piston engine according to the invention is generally designated by reference numeral 10 and includes a rotor housing 12 comprising a peripheral housing part 14 and a pair of axially spaced side housing parts 16 (only one of which is shown) disposed on both sides of the peripheral housing part 14. The peripheral housing part 14 has an inner surface or peripheral wall 15 formed of the outer envelope of epitrochoidal curves having two arches. The side housing parts have flat walls which form the side walls of the rotor housing 12. A generally triangular rotary piston or rotor 18 is received in a cavity defined in the rotor housing 12 and has apex seals 18a, 18b and 18c mounted on the rotor at its three apexes. The outer peripheral surface of the rotor 18 is formed of the inner envelope of epitrochoidal curves. The rotor 18 is so mounted as to perform a planetary rotary motion about the axis of an output shaft 20 so that the apex seals 18a to 18c are always in sliding sealing contact at their outer edges with the inner peripheral wall 15 of the peripheral housing part 14. The rotor 18 also has side seals (not shown) which are in sliding sealing contact with the side walls 16. The output shaft 20 is disposed at the center of the rotor housing 12 and extends axially thereof to transmit the planetary rotary motion of the rotor 18 to the outside of the engine 10. The inner peripheral and side walls 15 and 16 of the rotor housing 12 cooperate with the three sides of the rotor 18 to define three variable volume working chambers 22, 24 and 26 which are moved along the inner peripheral surface 15 of the housing as the rotor 18 is rotated. Each of the working chambers 22 to 26 is sequentially transformed into intake, compression, combustion-expansion and exhaust chambers as the planetary rotary motion of the rotor 18 proceeds.

One of the side housing parts 16 is formed therein with an intake port 28 which is so located as to be open to the intake chamber of the engine and connected to an intake system 30 mounted on the rotor housing 12. In the illustrated embodiment of the invention, the intake system 30 is of known type for producing a mixture of a gasified fuel and air and includes an intake pipe 32 connected at its downstream end to the intake port 28, a richness controlling device 34 connected to the upstream end of the intake pipe 32 and an air cleaner 36 mounted on the top of the richness controlling device 34. The richness controlling devices 34 is connected by a pipe 38 to a gasified fuel supplying means 40 which is of known type for feeding a gasified fuel such as LPG and includes an LPG tank 42, a pressure regulator 44 and a pipe 46 extending therebetween. The intake system 30 is operative to mix the air from the air cleaner 36 with the gasified fuel from the fuel supplying means 40 and feed the air-fuel mixture through the intake port 28 into the intake chamber in the engine.

The peripheral housing part 14 is formed therein with an exhaust port 50 which is so disposed as to be open to the exhaust chamber in the engine and which is connected with an afterburner 52, such as a reactor, for burning therein the unburnt components of the exhaust gases from the engine to thereby purify the engine exhaust gases. An exhaust pipe 54 extends from the afterburner.

The peripheral housing part 14 is also formed therein with a plug hole 60 which is open to the cavity in the rotor housing 12 and which is so disposed as to be communicated with the intake chamber when it is in its final stage of intake stroke. Thus, the intake chamber is communicated with both intake port 28 and plug hole 60 for the reason to be made apparent later. The opening of the plug hole 60 in the inner peripheral surface 15 of the peripheral housing part 14 is of a small diameter to prevent communication between working chambers 22 and 24 at the moment when each of the apex seals 18a to 18c is moved over the plug hole 60. An ignition plug 62 is mounted on the peripheral housing part 14 so that a set of electrodes 64 of the plug is disposed in the plug hole 60 at a point remote from the inner peripheral surface 15 of the peripheral housing part 14.

A passage 70 is formed in the peripheral housing part 14 and has an inner end connected to the plug hole 60 at a point adjacent to the electrodes 64 of the ignition plug 62. The passage 70 is connected at its outer end to a valve hole 72 which is also formed in the peripheral housing part 14. A check valve means 74 is received in the valve hole 72. As will be best seen in FIG. 1A, the check valve means 74 comprises a cup-shaped member 76 fitted into the inner part of the valve hole 72 and a bolt-like plug member 78 screwed into the valve hole 72 to close the outer end thereof as well as to hold the cup-shaped member 76 in position. A recess in the cup-shaped member 76 cooperates with the inner end of the plug member 78 to define a chamber 80. The cup-shaped member 76 is formed therein with an axial passage 77 which is in communication with both the passage 70 and the chamber 80. The plug member 78 is also formed therein with an axial passage 79 extending through the plug member from the inner end thereof and terminating short of the outer end of the plug member. Radial passages 82 are also formed in the plug member 78 and extend from the axial passage 79 to the outer peripheral surface of the plug member.

A valve member 84 is received in the chamber 80 for movement axially of the chamber. The valve member 84 has an outer arrow-headed end 86 adapted to be in sealing engagement with the peripheral edge of the inner end of the axial passage 79 in the plug member 78 when the valve member 84 is moved outwardly. The inner end of the valve member 84 is formed into a skirt 88 in which generally axial passages or apertures 90 are formed to communicate the chamber 80 with the passage 77 when the valve member 84 is moved to its inner position in which the skirt 88 rests on the bottom of the valve hole 72.

A blind hole 92 is formed in the peripheral housing part 14 transversely of the plug member 78 and closed at the outer end by a plug 94. The radial passages 82 in the plug member 84 are opened to the blind hole 92. A port 96 extends axially through the peripheral housing part 14 and is connected at one end to the blind hole 92. The other end of the port 96 is connected to one end of a passage 98 extending through one of the side housing parts 16 from one side of the rotor housing 12 to the other where the passage 98 is connected to one end of a pipe 100 which in turn is connected at the other end to a pressure reduction chamber (not shown) in the pressure regulator 44.

In operation, it is assumed that the working chamber 22 is in its initial stage of intake stroke in which the chamber 22 is communicated with the intake port 28 only to suck a charge of air-fuel mixture therefrom. As the rotor 18 is rotated in clockwise direction as viewed in FIG. 1, one of the apex seals 18b is moved downwardly over the opening of the plug hole 60 in the inner peripheral surface 15 of the rotor housing 12. Simultaneously, the plug hole 60 is brought into communication with the intake chamber 22. When the rotor 18 is rotated to a position in which the intake chamber 22 is in its final stage of its intake stroke, the pressure within the intake chamber and the plug hole 60 is reduced to a value which is substantially equal to the vacuum in the intake pipe 32. Due to the difference between the pressure in the plug hole 60 (and in the intake chamber 22) and the pressure in the pressure reduction chamber in the pressure regulator 44 of the fuel supplying means 40, the valve member 84 is moved to its inner position to open the inner end of the axial passage 79 in the plug member 78 of the check valve means 74 whereby an amount of the gasified fuel flows from the pressure regulator 44 through the pipe 100, passage 98, port 96, blind hole 92, radial and axial passages 82 and 79, chamber 80, aperture 90 in the valve member 84, passage 77 in the cup-like member 76, passage 70 and plug hole 60 into the intake chamber 22. It will be appreciated that the burned inert residual gases produced in the preceding combustion stroke of the engine and retained in the plug hole 60 adjacent to the electrodes 64 are forced into the intake chamber 22 by the flow of the gasified fuel from the pressure regulator 44 into the chamber 22. In other words, the plug hole 60 and the electrodes 64 of the ignition plug 62 are effectively scavenged and are now surrounded by the fresh gasified fuel. When the rotor 18 is further rotated to close the intake port 28, the working chamber 28 is transformed into the compression chamber. As the pressure increases within the compression chamber, a part of the air-fuel mixture is forced into the plug hole 60, the passage 70 and chamber 80 to move the valve member 84 into sealing engagement with the inner end of the axial passage 79 in the plug member 78. The electrodes 64 of the ignition plug 62 are now surrounded by the air-fuel mixture of a richness or air-fuel ratio which is appropriate for spark-ignition. When the air-fuel mixture in the compression chamber and the plug hole 60 is burnt, the pressure is further increased to hold the valve member 84 in sealing engagement with the inner end of the passage 79 in the plug member 78.

The amount of the gasified fuel introduced through the passage 70 and the plug hole 60 into the intake chamber depends upon the difference in pressure between the pressure reduction chamber in the pressure regulator 44 and the intake chamber in the engine. When the engine operates in a light or partial load condition, residual gases remaining in the engine and thus in the plug hole 60 are of a larger amount compared with the cases where the engine operates in other operating conditions. In the partial load condition, however, the pressure difference between the intake chamber and the pressure reduction chamber of the pressure regulator 44 is larger compared with the other operating conditions of the engine with a result that the electrodes 64 of the ignition plug 62 are effectively scavenged also in the partial load operating condition of the engine. Thus, it will be appreciated that the present invention not only assures stable spark ignitions of air-fuel charges to the engine and thus a smooth operation of the engine but also solves, or at least minimizes, the problem of emission control.

In the described embodiment of the invention, the scavenging of the ignition plug electrodes has been described as being by means of a gasified fuel. However, the object of the invention can also be achieved by use of an air-fuel mixture at an appropriate air-fuel ratio.

Figure 2:
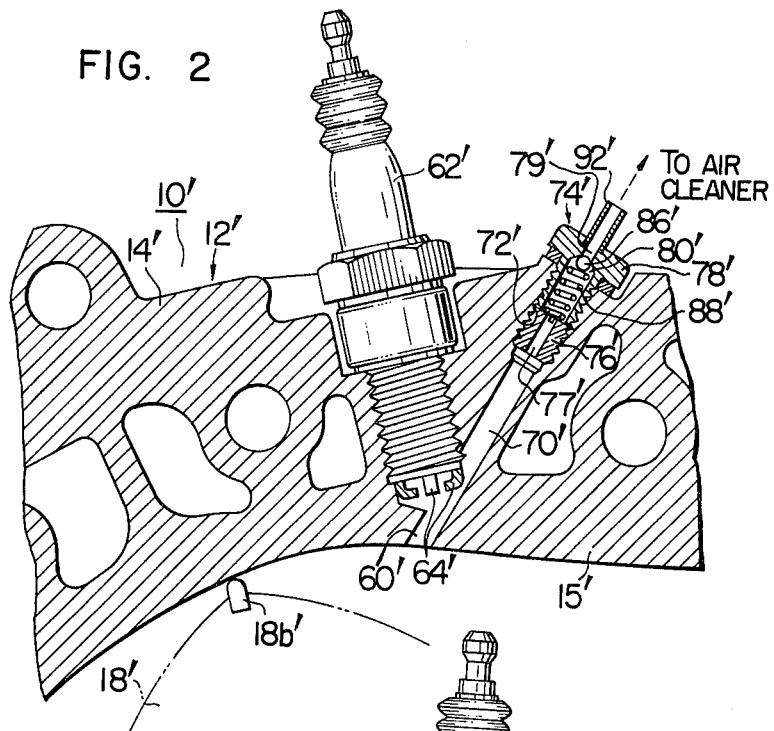
FIG. 2 is a fragmentary sectional side elevation of a second embodiment of the rotary piston engine according to the present invention.

A second embodiment of the invention will be described with reference to FIG. 2 in which parts of the second embodiment similar to those in the first embodiment are designated by similar reference numerals added with a prime ('). A set of electrodes 64' of an ignition plug 62' is disposed in a plug hole 60' which is open in an inner peripheral surface 15' of a peripheral housing part 14' of a rotor housing 12' of a rotary piston engine 10'. An air passage 70' is formed in the peripheral housing part 14' and connected at an inner end to the plug hole 60' at a point adjacent to the plug electrodes 64'. The air passage 70' is connected at the outer end to a valve hole 72' extending from the outer end of the air passage 70' to the outer peripheral surface of the peripheral housing part 14'. A check valve means 74' is provided in the valve hole 72' to control the supply of air through the air passage 70' to the plug electrodes 64' and into a working chamber in the engine 10'.

The check valve means 74' includes a first headless screw member 76' which has an axial passage 77' extending therethrough and which is screwed into the valve hole 72' to the inner end thereof. A second headed screw member 78' is also screwed into the valve hole 72' into abutment contact with the outer end of the first screw member 76'. The head portion of the second screw member 78' is formed therein with an axial aperture 79' open in the outer or top face of the screw head. The second screw member 78' is also formed therein with an axial hole 80' extending from the inner end of the second screw member to the aperture 79'. The hole 80' has a diameter larger than the passage 77' in the first screw member and than the aperture 79', so that the hole 80' forms a chamber in which a ball 86' of a hard material, such as steel, is disposed and resiliently biassed outwardly against the peripheral edge of the inner end of the aperture 79' by a compression coil spring 88'. The aperture 79' is connected by a conduit 92' to an air cleaner (not shown) of the engine 10'.

When the plug hole 60' is communicated with an intake chamber, the vacuum produced in the intake chamber is large enough to inwardly move the ball 86' against the compression spring 88' to allow air to flow through the aperture 79', chamber 80', passages 77' and 70' and the plug hole 60' into the intake chamber, as in the first embodiment. When the intake chamber is transformed into a compression chamber, the compression spring 88' moves the ball 86' into sealing engagement with the peripheral edge of the inner end of the aperture 79'.

The conduit 92' may alternatively be connected to a carburetor (not shown) just upstream of the throttle valve therein to feed an air-fuel mixture to the plug hole 60'.

Figure 3:
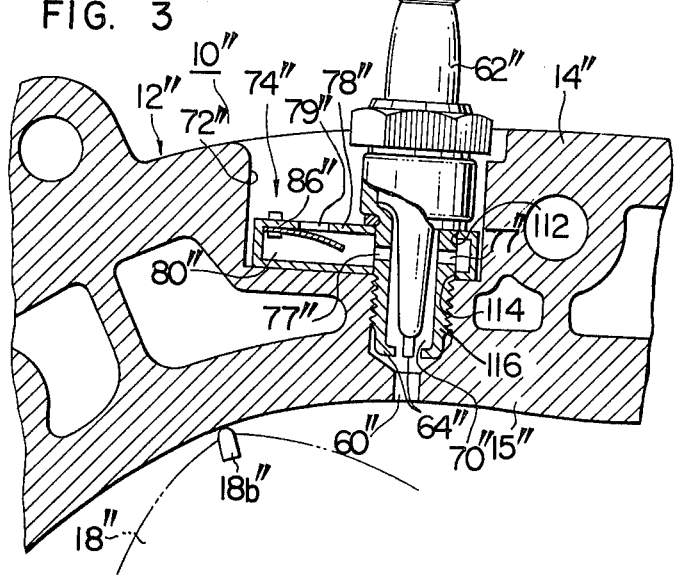
FIG. 3 is a view similar to FIG. 2 but illustrates a third embodiment of the rotary piston engine according to the present invention.

A third embodiment of the invention is shown in FIG. 3 and is generally designated by 10". The parts which are structurally or functionally similar to those in the first embodiment are designated by similar reference numerals added with double prime ("). A recess 72" is formed in the outer peripheral surface of a peripheral housing part 14" of a rotor housing 12". A check valve means 74" is received in the recess 72". The check valve means includes a hollow box-like member 78" having a lower or inner wall in fluid-tight engagement with the bottom wall of the recess 72". An orifice or aperture 79" is formed in the upper or outer wall of the box-like member 78". A resiliently flexible leaf 86" is secured to the inner surface of the outer wall of the box-like member 78" to form a valve member which, when moved into contact with the outer wall of the box-like member 78", closes the orifice 79".

An ignition plug 62" extends hermetically through openings 112 and 114 in the outer and inner walls of the box-like member 78" and is screwed into the peripheral wall of the peripheral housing part 14". A plug hole 60" is formed in the peripheral housing part 14" in coaxial relationship with the ignition plug 62" and is open in the inner peripheral surface 15" of the housing part 14". In the tubular sleeve portion 116 of the ignition plug 62"

from which sleeve portion grounded electrodes of the ignition plug extend, there are formed radial passages or apertures 77" which are so positioned as to be open to the interior of the box-like member 78". The annular space between the tubular sleeve portion 116 and the center electrode of the ignition plug acts as an air passage 70" which communicates the radial apertures 77" with the plug hole 60".

The embodiment shown in FIG. 3 is operable in a manner similar to those discussed in connection with FIGS. 1 and 2. The air flowing from the interior of the box-like member 78" through the radial apertures 77" and air passage 70" to the plug hole 60" and into an intake chamber in the engine 10" is effective not only to scavenge the plug electrodes 64" but also to cool the center electrode of the plug 62". The check valve means 74" can easily be replaced by another check valve means. In the illustrated embodiment 10", the orifice 79" is open to the atmosphere. The orifice, however, may alternatively be connected by a conduit (not shown) to a carburetor (not shown) just upstream of the throttle valve thereof to feed an air-fuel mixture through the check valve means 74" and the air passage 70" to the plug hole 60" and into an intake chamber in the engine.

What is claimed is:

1. An improved rotary piston engine comprising a housing defining a cavity therein, a rotor disposed in said cavity for planetary motion therein, said housing and said rotor cooperating to define therebetween a plurality of working chambers, the planetary rotary motion of said rotor causing each of said working chambers to sequentially act as intake compression, combustion-expansion and exhaust chambers, said rotor having three apexes with adjacent apexes defining, respectively, the leading and trailing edges of each of said working chambers, an intake port formed in said housing and so positioned as to be open to said intake chamber, means for supplying a mixture of air and fuel through said intake port into the intake chamber, a plug hole formed in said housing and so positioned as to be opened to a working chamber, an ignition plug having a set of electrodes disposed in said plug hole to ignite the air-fuel mixture in said intake chamber, said engine including a passage means for introducing a scavenging gaseous fluid through said plug hole into said intake chamber, check valve means disposed in said passage means for allowing said scavenging gaseous fluid to flow through said passage means toward said intake chamber, said plug hole being positioned in said housing with respect to said intake port such that said intake chamber's leading edge passes said plug hole to establish communication between said plug hole and said intake chamber as said trailing edge of said intake chamber begins to pass said intake port in the final stage of the intake stroke.

2. A rotary piston engine as claimed in claim 1, wherein said passage means has one end connected to said plug hole, the other end of said passage means being exposed to the atmosphere whereby air is supplied through said passage means and said plug hole into said intake chamber.

3. A rotary piston engine as claimed in claim 1, further including an air cleaner disposed upstream of said intake port, and wherein said passage means has upstream and downstream ends connected to said air cleaner and said plug hole, respectively, so that air only is supplied through said passage means and said plug hole into said intake chamber.

4. A rotary piston engine as claimed in claim 1, wherein said ignition plug has a hollow tubular portion, at least one grounded electrode extending therefrom into said plug hole and a center electrode extending axially through said tubular portion in radially spaced relationship thereto to cooperate with said grounded electrode to define a spark gap therebetween, said tubular portion being formed therein with at least one aperture extending between the inner and outer peripheral surfaces of said tubular portion, and wherein said passage means has one end which is in fluid flow communication with the interior of said tubular portion through said aperture.

5. A rotary piston engine according to claim 1, wherein said passage means has one end connected to said plug hole and wherein said engine further includes a supply source of a combustible gaseous fuel connected to the other end of said passage means.

6. A rotary piston engine according to claim 5, wherein said gaseous fuel supply source includes a container for a liquefied combustible gas and a pressure regulator in fluid flow communication with said container and said passage means.

7. A rotary piston engine according to claim 6, wherein said air-fuel supplying means is in fluid flow communication with said pressure regulator and said intake port.

8. A rotary piston engine according to claim 2, wherein said check valve means includes a spring-loaded valve member disposed in said passage means.

9. A rotary piston engine comprising:
(a) a housing defining therein a cavity and an intake port extending through the wall of said housing and open to said cavity;
(b) a rotor disposed in said cavity for planetary rotary motion therein;
(c) said housing and said rotor cooperatively defining therebetween a plurality of working chambers which move with said rotor along the inner surface of said housing and vary in volume as the planetary rotary motion of said rotor proceeds; said rotor having three apexes with adjacent apexes defining, respectively, the leading and trailing edges of one of said working chambers;
(d) said working chambers being successively brought into communication with said intake port;
(e) means connected to said intake port for supplying a mixture of air and a fuel into said cavity;
(f) means for igniting the air-fuel mixture in said cavity to produce power therein;
(g) said igniting means including a plug hole formed in said housing and open to said cavity and an ignition plug having a set of electrodes disposed in said plug hole;
(h) said plug hole being brought into communication with successive working chambers;
(i) said plug hole being positioned in said housing with respect to said intake port such that a said working chamber's leading edge passes said plug hole to establish communication between said plug hole and said working chamber as said trailing edge of said working chamber begins to pass said intake port in the final stage of an intake stroke;
(j) means for introducing a scavenging gaseous fluid through said plug hole into the working chamber which is being communicated with said intake port;

(k) said fluid introducing means including a passage means at least a part of which extends through the wall of said housing, and a check valve means mounted on said housing and having a valve member disposed in said passage means and operative to allow said scavenging gaseous fluid to flow only in the direction toward said cavity;

(l) said part of said passage means being connected at one end to said plug hole so that said plug electrodes are at least partially exposed to the flow of said scavenging gaseous fluid from said passage means through said plug hole into the working chamber which is being communicated with said intake port, whereby said plug electrodes and said plug hole are scavenged each time when said plug hole and said intake port are both communicated with the working chamber which is in communication with said intake port.

* * * * *